United States Patent Office 2,722,485
Patented Nov. 1, 1955

2,722,485

METHOD FOR PRODUCING COLORING PIGMENT

Otto Jensen, Kansas City, Mo., and William T. Walton, Chicago, Ill., assignors to Seidlitz Paint and Varnish Company, Kansas City, Mo., a corporation of Missouri No Drawing. Application January 10, 1951, Serial No. 205,414

1 Claim. (Cl. 106—241)

This invention relates to a method of producing coloring pigment for surface coating liquids and the primary aim is to provide a novel, commercially practicable, relatively inexpensive method of manufacturing a powdered color base for liquid surface coatings, such as paint, lacquer and analogous substances, and which will be constantly effective in the production of such color base to the point of assuring that a given amount of the powdered color base when added to a given amount of appropriate liquid base will always produce a product of like and predetermined coloring characteristics.

One of the important aims of the invention is the provision of a series of steps in the manufacture of a dry, powdered color base for paint, at least one of which steps includes the removal of an element from a plurality of ingredients without the accompanying hazards and dangerous conditions that have heretofore been prevalent in the production of the material involved.

A further aim of the present invention is the provision of an unique process for the manufacture of powdered color bases, usable in the production of paint or the like, which process comprises intimately intermixing the components of the color base with a water soluble solvent and later introducing the resultant mixture into a sufficient amount of water to absorb the solvent and leave a precipitate consisting of at least a resin and a pigment capable of being dried and sifted to a state of commercially practical character and that may be added to the paint either by the commercial producer thereof or by the purchaser of small quantities of paint for use in a domestic sense.

This application is a continuation-in-part of application Serial No. 782,460, filed October 27, 1947, and relating to method of producing a composition of matter in the nature of a paint color base.

A still further aim of the instant invention is the provision of a method of producing coloring pigment for surface coating liquids which employs commercially available filter cake from which to obtain the pigment and that is intimately intermixed with a resin solution to insure the production of a resinated pigment of constant coloring characteristics when a predetermined amount of filter cake is employed and that will always be effective in coloring a given quantity of the appropriate base liquid to the same degree when a predetermined volume of said liquid base is combined with the resinated pigment.

A yet further aim of the present invention is the provision of an unique method of producing resinated coloring pigment which employs filter cake including a coloring pigment in a finely divided form, thereby to avoid the necessity of employing equipment such as a ball mill as has heretofore been the common and general practice in the production of coloring pigments for paints. In the filter cake used for the present process, the pigment is in its finest divided state, and this condition prevails throughout the process.

In the manufacture of powdered color base for paints or the like, a suitable hard, high melting point resin of the synthetic or natural type is desirable as is a pigment. This pigment is combined with the resin before a satisfactory color base may be produced and to establish that combination between resin and pigment, it is conventionally necessary to employ a solvent for the resin and then remove that said solvent insofar as possible, prior to drying the mass that comprises principally the resin and the pigment.

Removal of the solvent from the mixture has heretofore been hazardous and dangerous because of the mechanical means employed. Also, the process heretofore used has been expensive and laborious because of the necessity of utilizing ball or other suitable mills to grind the mixture of hard resin and color pigment. The use of filter cake in this process precludes any necessity of reducing agglomerates to particle size, and thus, perfect dispersion is insured.

In the concepts of the invention, filter cake in paste or semi-paste form and having the desired pigment therein is employed. The water content of the filter cake is determined prior to use thereof, for as the water content of the filter cake increases, the amount of water soluble solvent is increased to insure maintaining the resin in solution and avoid precipitation before the resin has attached itself to the pigment.

A hard resin of natural or synthetic type, but which is insoluble in water, is dissolved in a water-soluble solvent such as methyl ethyl ketone, mono ethyl ether of ethylene glycol acetate, mono ethyl ether of ethylene glycol and methyl acetate or mixture thereof; and the necessary amount of organic or inorganic color pigment is mixed with said solution of resin and solvent by adding the filter cake. During the addition of the filter cake to the solution of resin and water-soluble solvent, slow agitation is employed by utilizing any conventional equipment that will thoroughly stir and agitate the components. Ordinary room temperatures are satisfactory, and the vessel containing the materials need not be closed or pressurized. The agitation continues until an intimate mixture is obtained, and the filter cake used may constitute pigments of the organic or synthetic types. At this point, it is notable that the amount of water present in the solution must never be sufficient to precipitate the resin. Examples hereinafter given and which have been employed take this fact into consideration. Also, pigments of various particle sizes resulting from the employment of different colors require different amounts of resins to obtain practical results, as appears in the examples hereinafter given. Finely divided pigments generally require greater amounts of resin.

After the aforesaid mixture has been intimately intermixed as above set down, the resultant mixture is added to five (5) volumes of water at room temperature under turbulent agitation to completely precipitate the resinated pigment as and in the form of a finely divided powder. After precipitating the resinated pigment, the same is recovered by simple centrifugation and the pigment is dried in an ordinary drying chamber and then sifted to any desired fineness. It has been found that eighty (80) mesh screen is convenient and satisfactory, but most particles of the pigment are much finer and such a screen is employed to insure at least that size of particle and to break by agitation any lumps that may have formed.

Manifestly, in the step of employing filter cake, more than one filter cake each having different pigments may be used. The product thus produced will be a dry resinated color concentrate of predetermined strength and color which will readily disperse in ready mixed paint, varnish or other liquid base to render predetermined tints and colors.

It will be apparent from the following examples that the three ingredients comprising the color base may vary in their specific characteristics so long as the resin is insoluble in water and the solvent is miscible or water soluble. Obviously, the water soluble solvent must be of a nature to dissolve the resin, and any one of the fourteen (14) following examples will teach the manner of preparing a batch of coloring material for paint. The examples reveal relations between resin and pigment that are commercially satisfactory. Variations therefrom may be made to suit conditions.

The color pigment which is mixed with the resin and solvent is in the filter cake that is commercially available. The resins found to be satisfactory are a natural resin, such as East India gum, metal resinates such as zinc resinate, lead resinate, rosin ester or a phenol formaldehyde resin.

*Example 1*

| | Parts |
|---|---|
| Resin solution | 40 |
| Chrome Yellow Medium filter cake containing 50% water and 50% pigment | 60 |

Yielding resinated Chrome Yellow Medium containing 60% pigment and 40% resin.

*Example 2*

| | Parts |
|---|---|
| Resin solution | 80 |
| Iron Blue filter cake containing 67½% water and 32½% pigment | 20 |

Yielding resinated Iron Blue composed of 15% pigment and 85% resin.

*Example 3*

| | Parts |
|---|---|
| Resin solution | 75 |
| Phthalocyanine Green filter cake containing 80% water and 20% pigment | 25 |

Yielding resinated Phthalocyanine Green containing 9% pigment and 91% resin.

*Example 4*

| | Parts |
|---|---|
| Resin solution | 75 |
| Phthalocyanine Blue filter cake containing 80% water and 20% pigment | 25 |

Yielding resinated Phthalocyanine Blue containing 9% pigment and 91% resin.

*Example 5*

| | Parts |
|---|---|
| Resin solution | 84 |
| Toluidine Red filter cake containing 72% water and 28% pigment | 16 |

Yielding resinated Toluidine Red containing 10% pigment and 90% resin.

*Example 6*

| | Parts |
|---|---|
| Resin solution | 66⅔ |
| Chrome Green filter cake containing 50% water and 50% pigment | 33⅓ |

Yielding resinated Chrome Green containing 33⅓ Chrome Green and 66⅔ resin.

*Example 7*

| | Parts |
|---|---|
| Resin solution | 50 |
| Chrome Orange filter cake containing 27% water and 73% pigment | 50 |

Yielding resinated Chrome Orange containing 60% pigment and 40% resin.

*Example 8*

| | Parts |
|---|---|
| Resin solution | 55 |
| Titanium dioxide filter cake containing 40% water and 60% pigment | 45 |

Yielding resinated titanium dioxide containing 49.6% pigment and 50.4% resin.

*Example 9*

| | Parts |
|---|---|
| Resin solution | 60 |
| Cadmium Lithopone Yellow filter cake containing 25% water and 75% pigment | 40 |

Yielding resinated Cadmium Lithopone Yellow containing 50% resin and 50% pigment.

*Example 10*

| | Parts |
|---|---|
| Resin solution | 60 |
| Cadmium Lithopone Red filter cake containing 25% water and 75% pigment | 40 |

Yielding resinated Cadmium Lithopone Red containing 50% pigment and 50% resin.

*Example 11*

| | Parts |
|---|---|
| Resin solution | 68 |
| Rubinox Red Toner filter cake containing 84% water and 16% pigment | 32 |

Yielding resinated Rubinox Red containing 15% pigment and 85% resin.

*Example 12*

| | Parts |
|---|---|
| Resin solution | 40 |
| Yellow iron oxide filter cake containing 60% water and 40% pigment | 60 |

Yielding resinated yellow iron oxide containing 55% pigment and 45% resin.

*Example 13*

| | Parts |
|---|---|
| Resin solution | 66 |
| Rubinox Red filter cake containing 84% water and 16% pigment | 32.38 |
| Phthalocyanine Green filter cake containing 80% water and 20% pigment | 1.62 |

Yielding resinated composite pigment (for Orchid tints) containing 13.45 Rubinox Red—0.85% Phthalocyanine Green—85.70% resin.

*Example 14*

| | Parts |
|---|---|
| Resin solution | 60 |
| Chrome Yellow medium filter cake containing 50% water and 50% pigment | 35 |
| Chrome Orange filter cake containing 27% water and 73% pigment | 25 |
| Phthalocyanine Blue filter cake containing 80% water and 20% pigment | 1 |

Yielding resinated composite pigment (for Buff-Tan tints) containing 26.56% Chrome Yellow Medium; 27.67% Chrome Orange; 0.30% Phthalocyanine Blue and 54.53% resin.

In practice, a resin selected from any one or all of those previously mentioned is dissolved in a suitable container or vat by a water soluble solvent, after which the pigment or pigments to be used to obtain the desired color base is introduced by the addition of a wet (water) color filter cake and slowly agitated for as long as five minutes. If the agitation is excessive, a premature precipitation will occur, all to the detriment of the end product.

In completion of the thorough intermixing in which the pigment has transferred from the water phase to the resin phase, the pigment-resin mixture is added to a relatively large volume of water during turbulent agitation, resulting in the solvent's dissolving in the water and precipitation of the pigment resin in a slurry of powdered material. The removal of the solvent is necessary because the combined resin and pigment must be dried and sifted before it can be introduced into the liquid base of the coating substance.

The water present must be in sufficient volume to absorb substantially all of the solvent, taking into consideration, of course, the water content of the filter cake or cakes. It has been found that up to five parts of water to one part of the pigment-resin mixture is necessary, and turbulent agitation should occur to produce the best results. When the water is added, the solution consisting of the resin, the solvent and the pigment cannot be maintained; and the solvent combines with the water by extraction, leaving the resin and pigment in a slurry form which, when filtered out, dried and sifted becomes the color base capable of tinting the paint with which it is mixed. This paint is usually white and forms the liquid base to which the dry resinated color pigment is added in predetermined amounts as to base and pigment to obtain tints and colors previously reached by test.

The solvent is necessary in performing the first step in the method because the aforesaid hard resin and pigment will not intermix at room temperatures without first breaking down the resin through a satisfactory solvent therefor. When the water does absorb the solvent, the intimately intermixed pigment and resin becomes the precipitate, easily removed from the liquid portion of the mass and capable of being dried and sifted.

The examples given are those which have heretofore been employed in the manufacture of a powdered color base; and, since the tint produced is of no moment, explanation of the type of pigment materials need not be made.

Having thus described the invention, what is claimed as new and desired to be secured by Letters Patent is:

The method of preparing a color base for use in tinting paints which consists of a finely divided homogeneous mixture of a water-insoluble resin and a pigment consisting of the steps of adding a pigment filter cake consisting of a mixture of pigment and water to a solution of a water-insoluble resin in a water-soluble organic solvent, slowly agitating the mass thus obtained to transfer the pigment from said pigment-water mixture into said resin solution and disperse said pigment homogeneously throughout said resin solution, adding water to said mass in the amount of about five volumes of water to one volume of said resin solution, turbulently agitating said water-diluted mass to extract said solvent from said resin solution and produce a slurry consisting essentially of a homogeneous mixture of said resin and pigment, removing said slurry from said water-diluted mass to produce a body of finely divided particles of pigmented resin, drying said body of particles and sifting said particles to produce a pigmented resin powder.

References Cited in the file of this patent
UNITED STATES PATENTS

| | | |
|---|---|---|
| 2,386,885 | Downs et al. | Oct. 16, 1945 |
| 2,539,429 | Jensen | Jan. 31, 1951 |
| 2,607,705 | Kumins | Aug. 19, 1952 |